US008712166B2

(12) United States Patent
Saito

(10) Patent No.: US 8,712,166 B2
(45) Date of Patent: Apr. 29, 2014

(54) DIFFERENCE DETECTING APPARATUS, DIFFERENCE OUTPUT APPARATUS, AND MEDIUM

(75) Inventor: Teruka Saito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 315 days.

(21) Appl. No.: 13/102,180

(22) Filed: May 6, 2011

(65) Prior Publication Data

US 2012/0093400 A1      Apr. 19, 2012

(30) Foreign Application Priority Data

Oct. 13, 2010   (JP) ................................. 2010-230396

(51) Int. Cl.
 *G06K 9/68* (2006.01)
(52) U.S. Cl.
 USPC ........................................................ 382/218
(58) Field of Classification Search
 None
 See application file for complete search history.

(56) References Cited

U.S. PATENT DOCUMENTS

| 5,640,200 | A  | * | 6/1997 | Michael ........................... 348/87 |
| 7,868,922 | B2 | * | 1/2011 | Ciuc et al. ................... 348/222.1 |
| 7,894,669 | B2 | * | 2/2011 | Gloudemans et al. ......... 382/176 |
| 8,275,215 | B2 | * | 9/2012 | Mei et al. ....................... 382/284 |

FOREIGN PATENT DOCUMENTS

| JP | 11-330183 A | 11/1999 |
| JP | 2004-54751 A | 2/2004 |
| JP | 2004-287682 A | 10/2004 |

* cited by examiner

*Primary Examiner* — Vikkram Bali
(74) *Attorney, Agent, or Firm* — Sughrue Mion, PLLC

(57) ABSTRACT

A difference detecting apparatus include: an image receiving unit that receives at least one or more first images and at least one or more second images; and an exception region acquiring unit that acquires (i) first exception regions that include non-background-color pixels of a first common image, (ii) second exception regions that include non-background-color pixels of a second common image, or (iii) both of the first exception regions and the second exception regions. The difference detecting apparatus includes a first difference detecting unit that detects differences between a first image of attention which is at least one of the first images and a second image of attention which is one of the second images corresponding to the first image of attention except for the first exception regions, the second exception regions, or a union or product of sets of the first exception regions and the second exception regions.

11 Claims, 12 Drawing Sheets

DIFFERENCE DETECTING APPARATUS, DIFFERENCE OUTPUT APPARATUS, AND MEDIUM

CROSS-REFERENCE TO RELATED APPLICATION

This application is based on and claims priority under 35 USC 119 from Japanese Patent Application No. 2010-230396 filed on Oct. 13, 2010.

BACKGROUND

Technical Field

The present invention relates to a difference detecting apparatus, a difference output apparatus, and a medium.

SUMMARY

According to an aspect of the invention, a difference detecting apparatus includes:

an image receiving unit that receives at least one or more first images and at least one or more second images;

an exception region acquiring unit that acquires (i) first exception regions that include non-background-color pixels of a first common image that consists of non-background-color pixels each of which exists in plural ones of the first images at a common position, (ii) second exception regions that include non-background-color pixels of a second common image that consists of non-background-color pixels each of which exists in plural ones of the second images at a common position, or (iii) both of the first exception regions and the second exception regions; and a first difference detecting unit that detects differences between a first image of attention which is at least one of the first images and a second image of attention which is one of the second images corresponding to the first image of attention except for the first exception regions, the second exception regions, a union of sets of the first exception regions and the second exception regions, or a product of sets of the first exception regions and the second exception regions.

BRIEF DESCRIPTION OF THE DRAWINGS

Exemplary embodiments of the invention will be described in detail based on the following figures, wherein.

DETAILED DESCRIPTION

Figure 1:
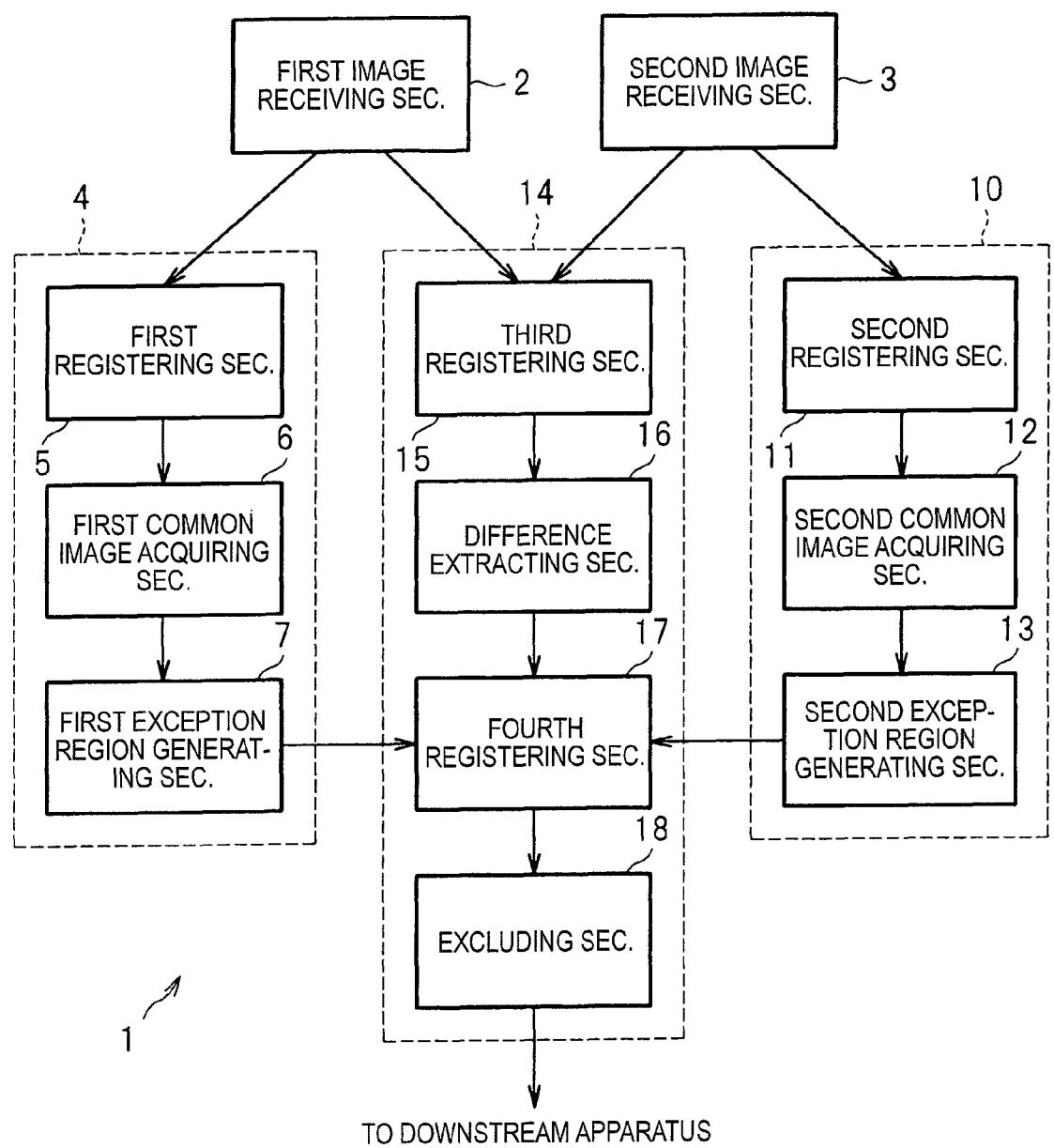
FIG. 1 is a functional block diagram of a difference detecting apparatus according to a first exemplary embodiment of the present invention.

FIG. 1 is a functional block diagram of a difference detecting apparatus 1 according to a first exemplary embodiment of the present invention.

Figure 2:
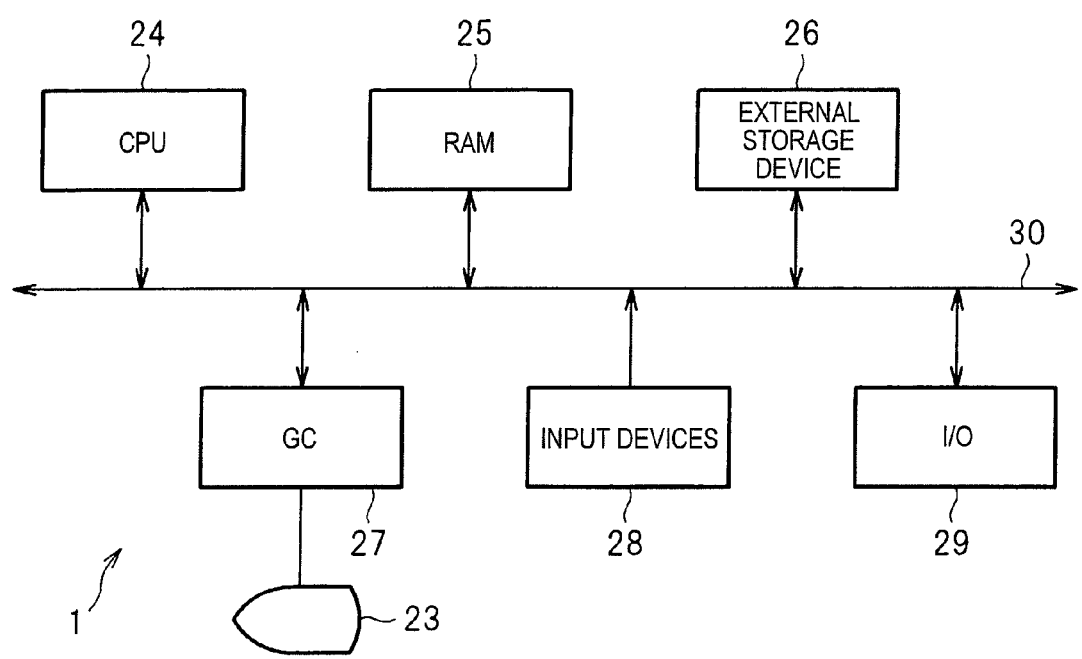
FIG. 2 is a block diagram showing the hardware configuration of the difference detecting apparatus which is implemented by using a general computer.

In a physical sense, the difference detecting apparatus 1 is implemented by using a general computer which is a general-purpose information processing apparatus. FIG. 2 is a block diagram showing the hardware configuration of the difference detecting apparatus 1 which is implemented by using a general computer. As shown in FIG. 2, in the difference detecting apparatus 1, a CPU (central processing unit) 24, a RAM (random access memory) 25, an external storage device 26, a GC (graphics controller) 27, input devices 28, and an I/O (input/output) interface 29 are connected to each other so as to exchange an electrical signal with each other. The external storage device 26 is a device capable of recording information statically, such as an HDD (hard disk drive) or an SSD (solid-state drive). The GC 27 outputs a signal to a monitor 23 such as a CRT (cathode-ray tube) display or a flat panel display which allows the user to recognize an image visually, and a corresponding image displayed on the monitor 23. The input devices 28 are devices such as a keyboard and a mouse which allow the user to input information. The I/O interface 29 is an interface which allows the difference detecting apparatus 1 to exchange information with an external apparatus or computer. The difference detecting apparatus 1 is implemented virtually in such a manner that a computer program for causing the computer to operate as the difference detecting apparatus 1 is run on the computer. For example, the computer program for causing the computer to operate as the difference detecting apparatus 1 may be provided in such manner as to be recorded on an arbitrary recording medium such as a DVD-ROM (DVD-read only memory) or a CD-ROM (compact disc-read only memory) or provided as a computer-readable electrical signal that is transmitted over an electric communication network such as a public network (typified by the Internet). FIG. 2 shows an example of a general computer as an information processing apparatus which is used for implementing the difference detecting apparatus 1, and the invention is not limited to the difference detecting apparatus 1 having the configuration of FIG. 2. The difference detecting apparatus 1 may also be implemented as a dedicated device using a microcontroller, a DSP (digital signal processor), or the like instead of a general computer. The difference detecting apparatus 1 may be constructed as an apparatus capable of operating independently or a module that is incorporated in or to be added to an office machine such as a copier or a facsimile machine.

The functional blocks of the difference detecting apparatus 1 shown in FIG. 1 which is implemented by a computer program are conceived for convenience of description paying attention to its functions and need not always exist physically.

A first image receiving section 2 and a second image receiving section 3 which function as image receiving means are interfaces for receiving arbitrary images as electronic data from the outside. The image receiving means is means for receiving one or more first images and one or more second images. In this exemplary embodiment, the first image receiving section 2 receives first images and the second image receiving section 3 receives second images. However, this discrimination is just for convenience of description and the first image receiving section 2 and the second image receiving section 3 may constitute a single section. In either case, first images and second images are received separately from each other.

Each of a first image and a second image may be an image recorded on a physical medium such as a paper or a microfilm or an image recorded as electronic data. Each of the first image receiving section 2 and the second image receiving section 3 may be in any form as long as it may receive an image in the form of electronic data. For example, each of the first image receiving section 2 and the second image receiving section 3 may be what is called a socket which performs input/output of information between processes being executed on a computer, an arbitrary information recording medium reading device or the like connected to an electric communication network such as a LAN (local area network) or a WAN (wide area network; e.g., a public network such as the Internet), or a scanner or a like device which reads image information on such a medium as a sheet or a microfilm through digitization. Each of the first image receiving section 2 and the second image receiving section 3 may have plural such devices. Put in terms to be used in FIG. 2, physically, the I/O interface 29 which is connected to an electrical communication network or an information recording medium reading device or a scanner connected to the I/O interface 29 corresponds to the first image receiving section 2 and the second image receiving section 3. Where the first image receiving section 2 and the second image receiving section 3 are a socket, they are implemented virtually by software and have no physical substance. Electronic data to be received may be in any form; it may have a vector data format such as DXF (drawing exchange format), data having metadata as in the case of data expressed in a page description language such as PDF (portable document format) and data expressed in a markup language such as XML (extensible markup language), or mere raster data. Where electronic data is data other than raster data, it may be developed into raster data for the convenience of execution of subsequent processing. However, such development is not indispensable.

A first image(s) or a second image(s) or both of first images and second images are a set of plural images. The term "a set of plural images" means a set of images relating to each other (e.g., to be used for a common purpose) as exemplified by diagrams of components of a certain product, continuous pages of a single article of a magazine or a brochure, or materials to be used for a presentation.

An edit such as an approval, proofreading, or corrections may be performed on the whole of a set of plural images rather than the individual constituent images. Even when substantial image variations have occurred only in part of the constituent images, a certain manipulation such as addition or a change of a final edit date and time, addition of a symbol indicating an approval, addition or a change of an editor name may be performed on all the constituent images. In the exemplary embodiment, the term "difference" (between two images) is used only when a person who sees the two images would find a substantial change between the two images and is not used when a person who sees the two images would not find a substantial change. For example, a manipulation that is performed on all the constituent images uniformly is not recognized as a substantial change and hence is not a difference as defined in the exemplary embodiment.

In the exemplary embodiment, first images and second images are a set of plural images before an edition a set of plural images after the edition, respectively. However, first images and second images may be a set of plural images after an edition a set of plural images before the edition, respectively. First images and second images may be different in number, and first images or second images may be a single image. Whereas in the exemplary embodiment differences are to be detected for first images, differences may be detected for any of the first images. That is, differences may be detected for a specified one or ones of the first images or all of the first images. In the following description, a first image for which the difference detecting apparatus 1 is going to detect differences is called a first image of attention. Therefore, where plural ones of first images are to be subjected to detection of differences, they are employed as a first subject image one by one. A second image corresponding to a first image of attention is called a second image of attention. A corresponding relationship between first images and second images may be determined in any manner; it may be given in advance according to image order, pieces of identification information, or the like or determined by image processing such as pattern matching. In the exemplary embodiment, it is assumed that a corresponding relationship between first images and second images is given in advance.

First images received by the first image receiving section 2 are passed to a first exception region acquiring section 4 as exception region acquiring means. The exception region acquiring means is means for acquiring first exception regions that include non-background-color pixels of a first common image that consists of non-background-color pixels each of which exists in plural first images at a common position, second exception regions that include non-background-color pixels of a second common image that consists of non-background-color pixels each of which exists in plural second images at a common position, or both of the first exception regions and the second exception regions. In the exemplary embodiment, the first exception region acquiring section 4 is exception region acquiring means which acquires first exception regions that include non-background-color pixels of a first common image that consists of non-background-color pixels each of which exists in plural first images at a common position.

The first exception region acquiring section 4 is provided with a first registering section 5, a first common image acquiring section 6, and a first exception region generating section 7. First, the first images are supplied to the first registering section 5.

The first registering section 5 performs registration which is processing of correcting positional deviations, if any, between common portions which are, for example, frames in the case where the first images are drawings, issue number portions or feature article name portions in the case where the first images are an article of a magazine or a brochure, or portions of common design items such as a company name and a logo mark in the case where the first images are presentation materials. As a result, the positions of non-background-color pixels of each first image are corrected so that the positions of the common portions of the plural first images are made the same. Where the background color is white, for example, colors (including black) other than white are non-background colors. First images and second images may be converted in advance into images of only two colors of black and white through conversion into two values after they are received by the first image receiving section 2 and the second image receiving section 3. The first registering section 5 is not indispensable; that is, it may be omitted if there should be no positional deviations between the first images. There are no particular limitations on the position correction method. For example, positional deviations may be corrected utilizing affine transformation. A reference of registration may be set in any manner. In the exemplary embodiment, registration is performed using a first image of attention as a reference.

Then, the first common image acquiring section 6 acquires a first common image which consists of non-background-color pixels each of which exists in plural first images at a common position. This processing may be any kind of processing as long as it may produce a first common image. In the exemplary embodiment, a first common image is acquired by the following processing. Pixel-by-pixel non-background-color pixel counts are calculated which are counts of non-background-color pixels occurring at the respective pixel positions of the plural first images. In other words, each pixel-by-pixel non-background-color pixel count is the number of first images that have non-background-color pixels at a common pixel position. If the pixel-by-pixel non-background-color pixel count is larger than or equal to a predetermined threshold value, it is judged that plural first images have non-background-color pixels at the pixel position concerned. A first common image is obtained by performing the above processing for all the pixels. The threshold value may be determined arbitrarily. For example, the threshold value may be 50% of the number of first images.

Then, on the basis of the first common image, the first exception region generating section 7 generates first exception regions each of which includes non-background-color pixels of the first common image. There are no particular limitations on the method for generating first exception regions. For example, first exception regions may be regions that are within a predetermined distance of regions of the non-background-color pixels of the first common image. In other words, in this method, regions obtained by expanding the respective regions of the non-background-color pixels of the first common image are employed as first exception regions.

Figure 3A:
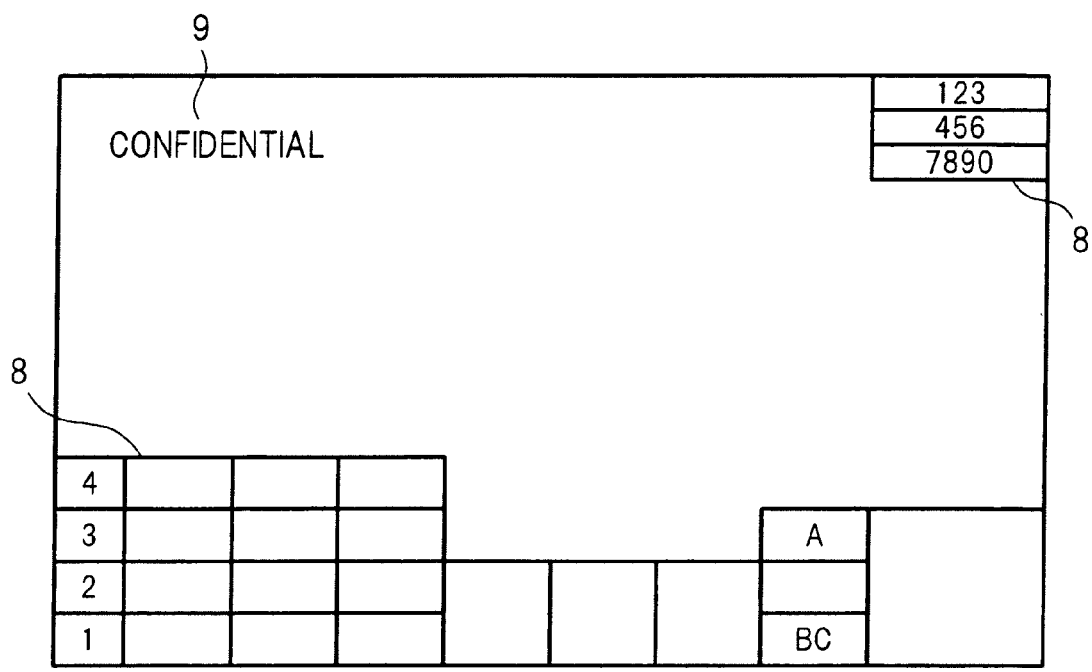
FIG. 3A shows an example first common image acquired from plural first images by a first common image acquiring section.
Figure 3B:
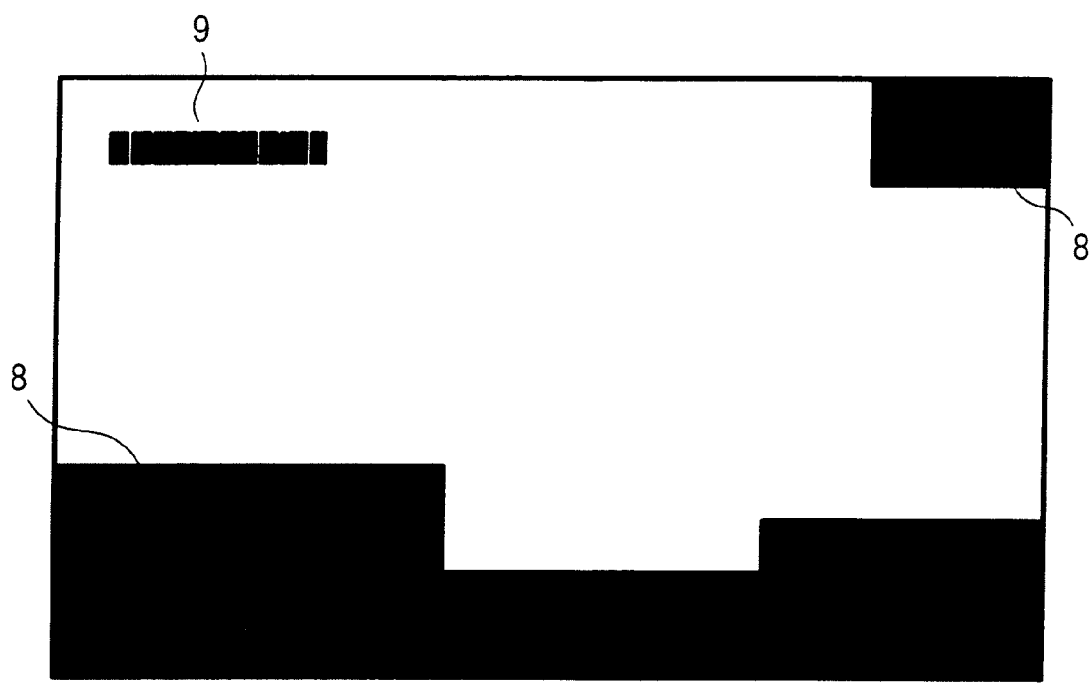
FIG. 3B shows first exception regions that are obtained from the example first common image shown in FIG. 3A.

In the exemplary embodiment, in addition to the processing of generating first exception regions by expanding the regions of the non-background-color pixels of the first common image, the first exception region generating section 7 performs additional processing in the case where non-background-color pixels of the first common image constitute characters or a table frame. This processing will be described below with reference to FIGS. 3A and 3B. FIG. 3A shows an example first common image acquired from plural first images by the first common image acquiring section 6. This example first common image basically represents drawing frames, and includes, in addition to a drawing outer frame, table portions 8 that appear to correspond to bibliographical items such as a drawing title and a component table and characters 9 that are common to the drawings. The first exception region generating section 7 discriminates non-background-color pixels that constitute frames of the table portions 8. The regions enclosed by these frames are made first exception regions. That is, if non-background-color pixels that are included in the first common image and constitute table frames, the regions enclosed by these frames are made first exception regions. There are no limitation on the method for discriminating the table portions 8 and their frames, and any method such as a method using known table structure analysis may be used. The first exception region generating section 7 also discriminates non-background-color pixels that constitute the characters 9. The regions occupied by the characters 9, that is, the regions that are necessary for arrangement of the characters 9 are also made first exception regions. These regions may be set by any of various methods. For example, a method using rectangles that circumscribe the characters 9 may be employed. In this case, the sides of each rectangle may extend in the vertical direction or the horizontal direction of the first common image. Alternatively, rectangles having a predetermined size that enclose the character 9 may be used. This method is effective in the case where the width of characters is predetermined (constant-width font). FIG. 3B shows first exception regions that are obtained from the example first common image shown in FIG. 3A. In FIG. 3A, black solid regions are first exception regions. As shown in FIG. 3A, the table portions 8 are drawn as solid portions and the characters 9 are enclosed by rectangles individually. The characters 9 may be recognized by any of various known methods. For example, a figure to which non-background-color pixels belong may be recognized as a character on the basis of its size and aspect ratio that are obtained by such a technique as labeling and feature quantities such as lengths of line segments included in the figure. The characters 9 may be recognized by a character recognition method employed in OCRs (optical character readers) etc.

The first exception region generating method described in the exemplary embodiment is just an example of methods that may be employed in the invention. The processing to be performed in the case where non-background-color pixels of the first common image constitute characters and the processing to be performed in the case where non-background-color pixels of the first common image constitute a table frame need not always be performed. That is, only one of these two kinds of processing may be performed or neither of these two kinds of processing may be performed. Furthermore, the regions of the first common image itself may be used as first exception regions (i.e., the regions of the non-background-color pixels of the first common image are not expanded).

Returning to FIG. 1, the second images received by the second image receiving section 3 are passed to a second exception region acquiring section 10 which functions as exception region acquiring means. In the exemplary embodiment, the second exception region acquiring section 10 is exception region acquiring means which acquires second exception regions that include non-background-color pixels of a second common image that consists of non-background-color pixels each of which exists in plural second images at a common position.

The second exception region acquiring section 10 is provided with a second registering section 11, a second common image acquiring section 12, and a second exception region generating section 13. The function of the second exception region acquiring section 10 is the same as that of the above-described first exception region acquiring section 4 except that the former processes the second images. That is, the second registering section 11, the second common image acquiring section 12, and the second exception region generating section 13 correspond to the first registering section 5, the first common image acquiring section 6, and the first exception region generating section 7, respectively, and have the same function as the latter except for the subjects of processing. The second exception region acquiring section 10 thus generates second exception regions on the basis of the second images.

Although in the exemplary embodiment the first exception region acquiring section 4 and the second exception region acquiring section 10 are described as separate sections for processing the first images and the second images, respectively, this is just for convenience of description and they may be the same section. Since the first exception region acquiring section 4 and the second exception region acquiring section 10 have the same function except that they have different inputs, if they are made the same section, that section functions as the first exception region acquiring section 4 when receiving first images and functions as the second exception region acquiring section 10 when receiving second images.

A first image of attention and a second image of attention as subjects of comparison which are included in the first images and the second images, respectively, are passed from the first image receiving section 2 and the second image receiving section 3 to a first difference detecting section 14 which functions as first difference detecting means. The first difference detecting means is means for detecting differences between the first image of attention which is at least one of the first images and the second image of attention which is a second image corresponding to the first image of attention except for the first exception regions, the second exception regions, the union of sets of the first exception regions and the second exception regions, or the product of sets of the first exception regions and the second exception regions. The first difference detecting section 14 is provided with a third registering section 15, a difference extracting section 16, a fourth registering section 17, and an excluding section 18.

The third registering section 15 is a section for correcting positional deviations between the first image of attention and the second image of attention. The first image of attention and the second image of attention would have many common portions because they correspond to each other. The third registering section 15 recognizes common portions of the first image of attention and the second image of attention by such a technique as pattern matching and corrects the position(s) of the first image of attention or the second image of attention or both. This correction may be performed by affine transformation as in the first registering section 5 and the second registering section 11. The third registering section 15 may also be omitted if it is not necessary. Also in the third registering section 15, a reference of registration may be set in any manner. In the exemplary embodiment, registration is performed using the first image of attention as a reference.

Then, the difference extracting section 16 extracts differences between the first image of attention and the second image of attention, that is, non-background-color pixels that exist in the first image of attention but do not exist in the second image of attention and non-background-color pixels that exist in the second image of attention but do not exist in the first image of attention.

The extracted differences are supplied to the fourth registering section 17. The fourth registering section 17 is a section for receiving, in addition to the differences extracted by the difference extracting section 16, the first exception regions (supplied from the first exception region acquiring section 4) and the second exception regions (supplied from the second exception region acquiring section 10) and correcting positional deviations between them. This registration may be performed in the same manner as in the first registering section 5, the second registering section 11, and the third registering section 15. This registration may be performed using pieces of information relating to the positional deviations (e.g., sets of transformation coefficients of affine transformation) obtained by the first registering section 5, the second registering section 11, and the third registering section 15. The fourth registering section 17 may also be omitted if it is not necessary.

The registered differences, first exception regions, and second exception regions are supplied to the excluding section 18. The excluding section 18 removes, from the differences obtained by the difference extracting section 16, (1) portions corresponding to only the first exception regions;

(2) portions corresponding to only the second exception regions;

(3) portions corresponding to the union of sets of the first exception regions and the second exception regions; or (4) portions corresponding to the product of sets of the first exception regions and the second exception regions.

Which of the portions (1) to the portions (4) should be removed may be determined according to the properties of the first images and the second images and the use of detected differences. The difference detecting device 1 may be configured so as to allow the user to determine which of the portions (1) to the portions (4) should be removed. In the exemplary embodiment, the portions (3) are removed.

As a result, differences that are caused by manipulations on portions that are common to the first images and portions that are common to the second portions are removed and differences that should be recognized as substantial changes are extracted as first differences. The removing method may be any method. One example method is to "paint over" portions to be removed in a background color.

The first difference detecting section 14 outputs the resulting first differences to a downstream arbitrary process or apparatus so that they will be used therein. There are no particular limitations on the downstream process or apparatus. Examples of the downstream process or apparatus are one for notifying the user that first differences have been detected, one for displaying detected first differences to the user visually, or one for recording detected first differences. Where the downstream process or apparatus is to merely notifying the user that first differences have been detected, it is checked whether or not the first differences that are output from the first difference detecting section 14 include non-background-color pixels and the user is notified of a judgment result. Where the downstream process or apparatus is to display or record first differences, the first differences that are output from the first difference detecting section 14 may be displayed or recorded as they are. Alternatively, as in a fourth exemplary embodiment to be described later, a certain manipulation may be performed on the first differences.

Next, a specific operation which is performed by the difference detecting device 1 according to the exemplary embodiment will be described with reference to FIGS. 1-4.

Figure 4:
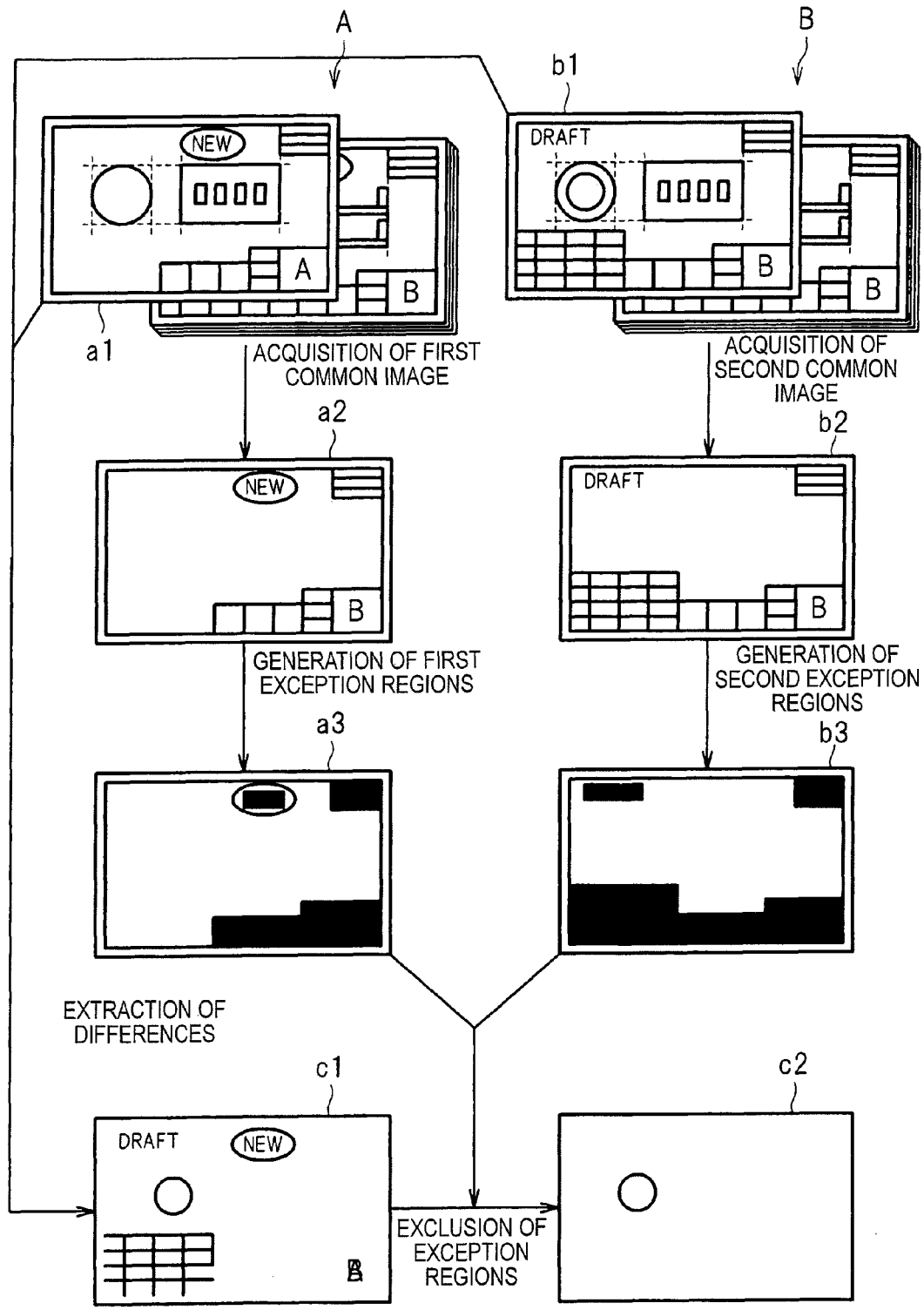
FIG. 4 illustrates an example operation which is performed by the difference detecting device according to the first exemplary embodiment of the invention.

FIG. 4 illustrates an example operation which is performed by the difference detecting device 1 according to the exemplary embodiment. In FIG. 4, symbol A denotes first images and symbol B denotes second images. Although in this example the first images A and the second images B are the same in number, as mentioned above the invention is not limited to such a case. That is, the first images and the second images may be different from each other in number. The top image of the first images A and the top image of the second images B are a first image of attention a1 and a second image of attention b1, respectively.

The first images A are received by the first image receiving section 2 and passed to the first exception region acquiring section 4. The first registering section 5 performs registration and the first common image acquiring section 6 acquires a first common image a2. The first common image a2 consists of non-background-color pixels that are common to the first images A. In this example, the first common image a2 includes drawing frames and a stamp "New." The first common image a2 is supplied to the first exception region generating section 7, which generates first exception regions a3. Put in strict terms, what is denoted by symbol a3 is an image including the first exception regions which are drawn as black solid regions in FIG. 4.

Likewise, the second images B are received by the second image receiving section 3. In the second exception region acquiring section 10, the second registering section 11 performs registration, the second common image acquiring section 12 acquires a second common image b2, and the second exception region generating section 13 generates second exception regions b3.

On the other hand, the first image of attention a1 and the second image of attention b1 are passed to the first difference detecting section 14. The third registering section 15 performs registration and the difference extracting section 16 extracts differences c1 between the first image of attention a1 and the second image of attention b1. The differences c1, the first exception regions a3, and the second exception regions b3 are registered mutually by the fourth registering section 17. The excluding section 18 removes portions corresponding to the union of sets of the first exception regions a3 and the second exception regions b3 from the differences c1. As mentioned above, what is removed is not limited to the union of sets. As a result, first differences c2 are obtained and output from the difference detecting device 1 to a downstream process or apparatus.

In the above description, the difference detecting device 1 determines first exception regions and second exception regions on the basis of first images and second images, respectively. However, the invention is not limited to such a case. The difference detecting device 1 may determine only first exception regions or second exception regions.

Figure 5:
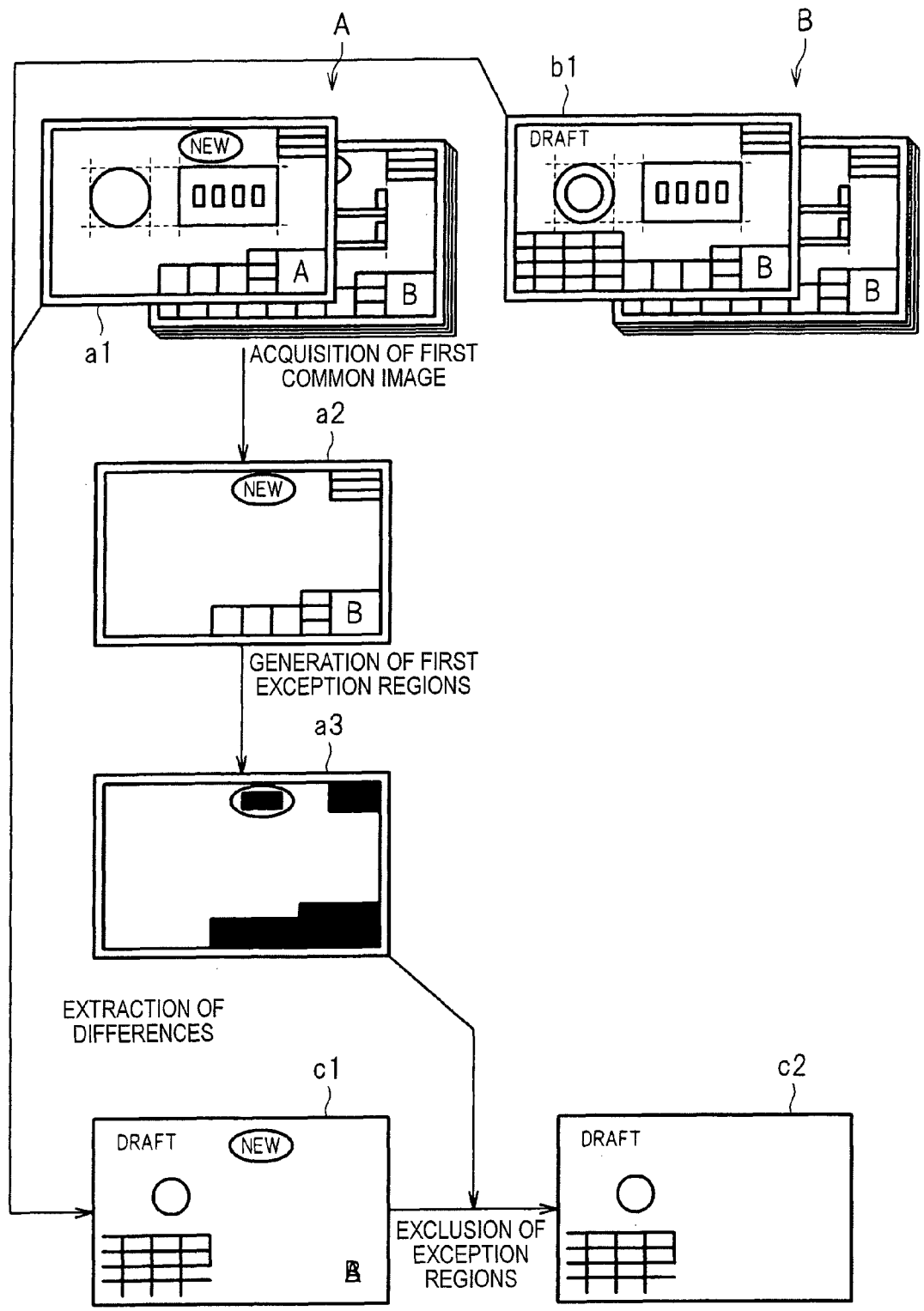
FIG. 5 illustrates an example operation which is performed by the difference detecting device in the case where only first exception regions are determined.

FIG. 5 illustrates an example operation which is performed by the difference detecting device 1 in the case where only first exception regions are determined. In FIG. 5, symbols denote the same kinds of images as in FIG. 4. In this example operation, first differences c2 are obtained by removing portions corresponding to first exception regions a3 from differences c1. Since neither a second common image b2 nor second exception regions b3 (see FIG. 4) are determined, the second exception region acquiring section 10 shown in FIG. 1 is not necessary and hence may be omitted. Furthermore, the second images B need not always be plural images and may be only the second image of attention b1. Where the number of second images B is small, that is, smaller than or equal to a threshold value (e.g., 2), the accuracy of a second common image b2, and hence second exception regions b3, would be low. In this case, the difference detecting device 1 may be configured so as to determine only first exception regions a3 (the second exception region acquiring section 10 is rendered non-operational). The same is true of a case that only second exception regions b3 are determined. In this case, the first exception region acquiring section 4 is not necessary and hence may be omitted.

Figure 6:
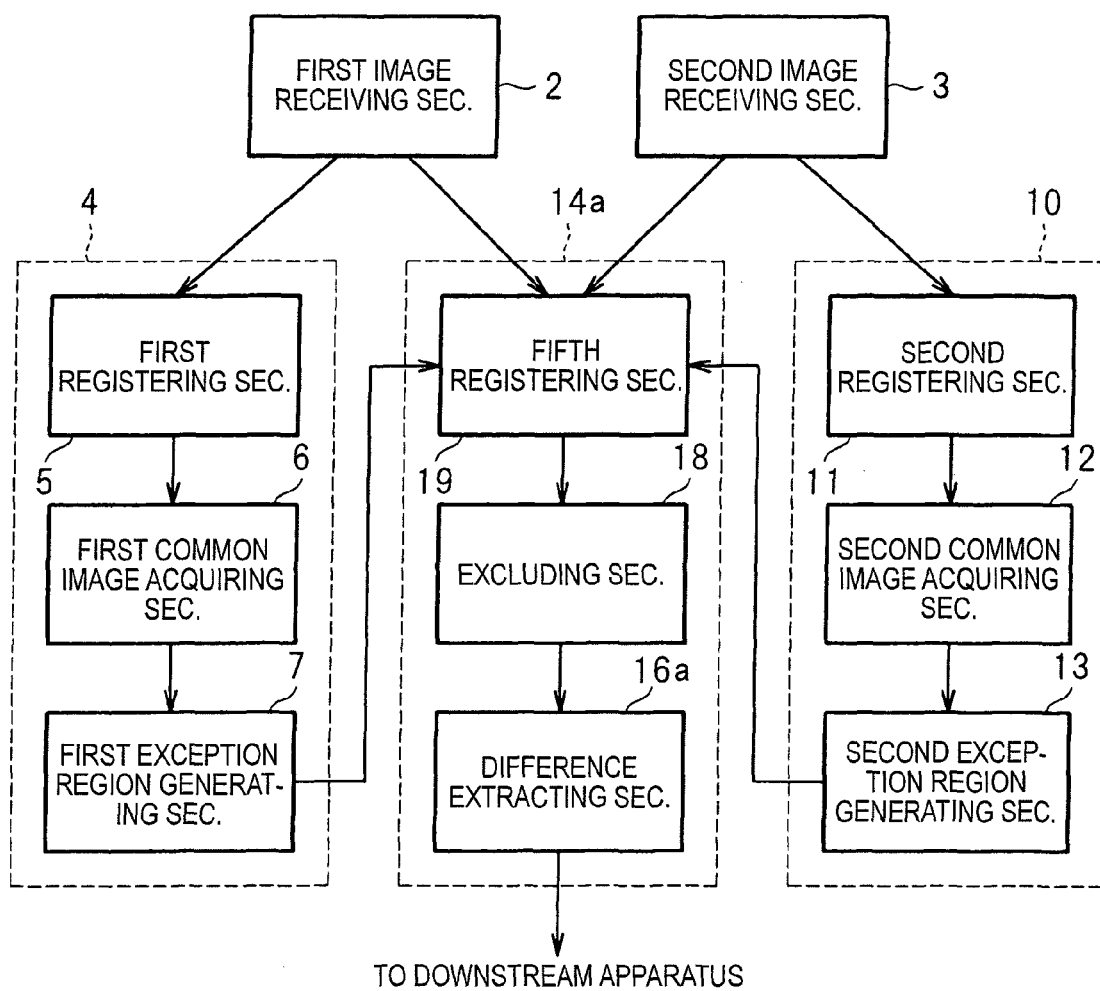
FIG. 6 is a functional block diagram of a difference detecting device according to a second exemplary embodiment of the invention.

FIG. 6 is a functional block diagram of a difference detecting device 101 according to a second exemplary embodiment of the invention. The second exemplary embodiment is the same as the first exemplary embodiment except for the configuration of a first difference detecting section 14a. Therefore, sections having the same ones in the first exemplary embodiment will be given the same symbols as the latter and will not be described redundantly.

In the first difference detecting section 14a according to this exemplary embodiment, the excluding section 18 is located upstream of the difference extracting section 16. In the first difference detecting section 14a, first, a first image of attention, a second image of attention, first exception regions, and second exception regions are supplied to a fifth registering section 19, and positional deviations of all of them are corrected (registration). This registration may also be performed by such a technique as affine transformation. A reference of registration may be set in any manner. In the exemplary embodiment, registration is performed using a first image of attention as a reference. The excluding section 18 excludes portions of any of the above-described items (1)-(4) from each of the first image of attention and the second image of attention. In the exemplary embodiment, portions of item (3) are excluded. Then, a difference extracting section 16a extracts differences (unnecessary portions are excluded) between the first image of attention and the second image of attention. As a result, the same first differences as in the first exemplary embodiment are obtained.

Figure 7:
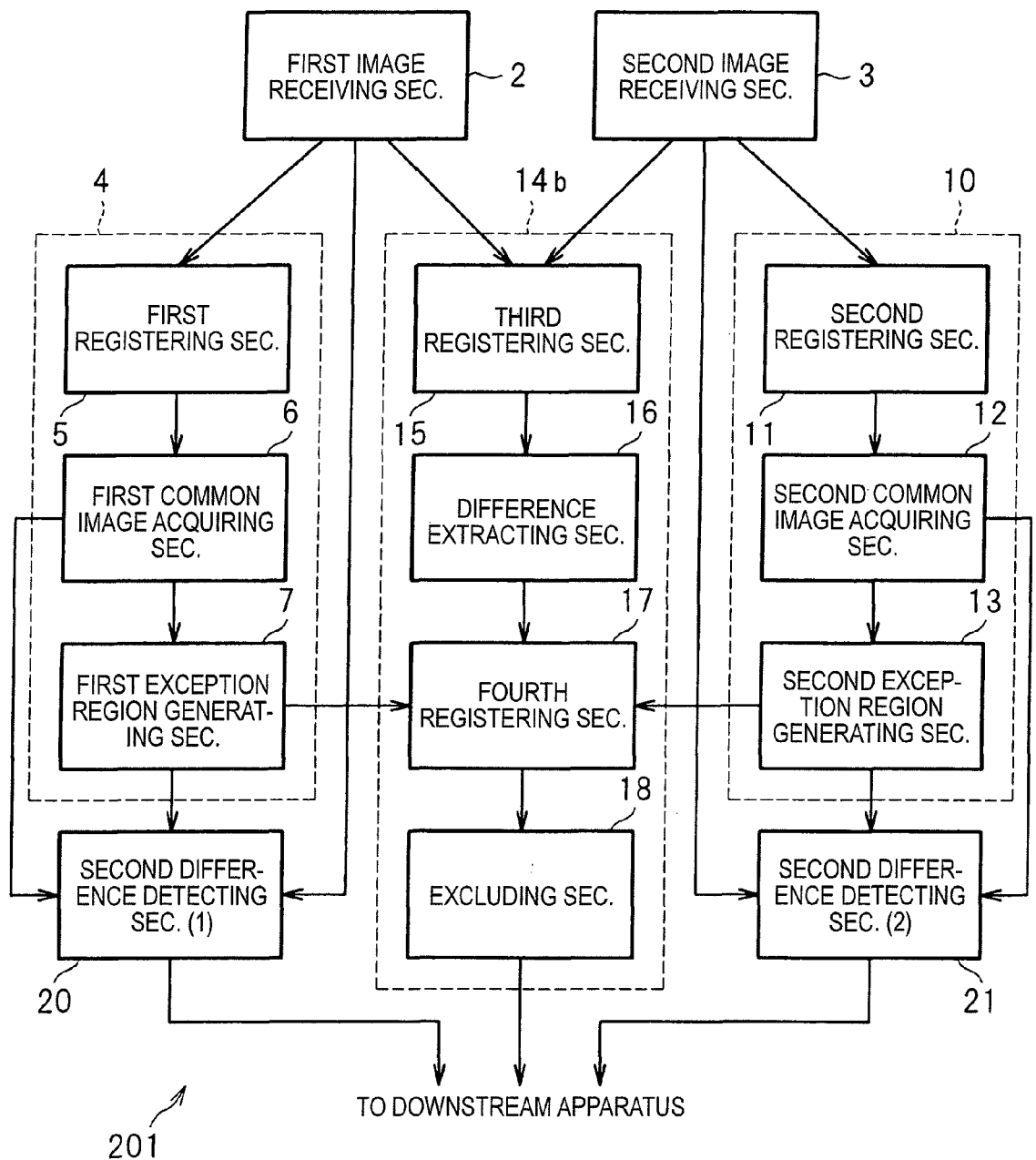
FIG. 7 is a functional block diagram of a difference detecting device according to a third exemplary embodiment of the invention.

Next, a third exemplary embodiment of the invention will be described. FIG. 7 is a functional block diagram of a difference detecting device 201 according to a third exemplary embodiment of the invention. The difference detecting device 201 according to third exemplary embodiment is different from the difference detecting device 1 according to the first exemplary embodiment in that a second difference detecting section (1) 20 and a second difference detecting section (2) 21 are added, and the other sections of the former are the same as those of the latter in configuration and function. Therefore, sections having the same ones in the first exemplary embodiment will be given the same symbols as the latter and will not be described redundantly.

The second difference detecting section (1) 20 functions as second difference detecting means, which is means for detecting differences between a first common image and a first image of attention in first exception regions, differences between a second common image and a second image of attention in second exception regions, or both of the differences between a first common image and a first image of attention in first exception regions and the differences between a second common image and a second image of attention in second exception regions. The second difference detecting section (1) 20 corresponds to the version of the second difference detecting means which detects differences between a first common image and a first image of attention in first exception regions.

The second difference detecting section (1) 20 detects second differences (1) which are differences between a first common image and a first image of attention in first exception regions. The term "second differences" means part, that would be recognized as substantial changes, of differences between an image including portions that are common to many constituent images of a set of images and an arbitrary one of the constituent images. The use of second differences is meaningful in a practical sense in, for example, the following point. Second differences indicate misentries, if any, made in one or a small number of images in a form that is used in common in plural images. In the exemplary embodiment, there may be two kinds of second differences, that is, ones associated with first images and ones associated with second images, which are called second differences (1) and second differences (2), respectively, in a discriminated manner.

There are non particular limitations on the specific processing performed by the second difference detecting section (1)

20. Any processing may be employed as long as it may detect second differences (1). In the exemplary embodiment, first an AND image of a first image of attention and first exception regions is generated and then differences between the AND image and a first common image are extracted. The differences, if any, are second differences (1).

In the exemplary embodiment, it is not necessary to perform registration before the second difference detecting section (1) 20 operates because the first registering section 5 has already performed registration using the first image of attention as a reference. However, depending on the reference used in the first registering section 5, registration may be performed before the second difference detecting section (1) 20 operates.

The second difference detecting section (2) 21 is the same as the second difference detecting section (1) 20 except that the former processes second images. That is, the second difference detecting section (2) 21 corresponds to the version of the second difference detecting means which detects differences between a second common image and a second image of attention in second exception regions.

In the exemplary embodiment, the second difference detecting section (2) 21 generates an AND image of a second image of attention and second exception regions and then extracts differences between the AND image and a second common image. The differences, if any, are employed as second differences (2). However, there are no particular limitations on this processing as long as it may produce second differences (2).

Although in the exemplary embodiment the second difference detecting section (1) 20 and the second difference detecting section (2) 21 are separate sections for processing first images and second images, respectively, this is just for convenience of description and they may be the same section. Since the second difference detecting section (1) 20 and the second difference detecting section (2) 21 have the same function except that they have different inputs, if they are made the same section, that section functions as the second difference detecting section (1) 20 when receiving first images and functions as the second difference detecting section (2) 21 when receiving second images.

In the difference detecting device 201 according to the exemplary embodiment, the first difference detecting section 14, the second difference detecting section (1) 20, and the second difference detecting section (2) 21 output first differences, second differences (1), and second differences (2), respectively, to a downstream arbitrary process or apparatus. There are no particular limitations on the downstream process or apparatus. Examples of the downstream process or apparatus are one for notifying the user that first differences or second differences have been detected, one for displaying detected first differences or second differences to the user visually, or one for recording detected first differences or second differences. Where the downstream process or apparatus is to merely notifying the user that first differences, second differences (1), or second differences (2) have been detected, it is checked whether or not the output first differences, second differences (1), or second differences (2) include non-background-color pixels and the user is notified of a judgment result. Where the downstream process or apparatus is to display or record first differences, second differences (1), or second differences (2), the output first differences, second differences (1), or second differences (2) may be displayed or recorded as they are. Alternatively, as in a fifth exemplary embodiment to be described later, a certain manipulation may be performed on the first differences, second differences (1), or second differences (2).

Although in this exemplary embodiment both of the second differences (1) and the second differences (2) as detection results are output to the downstream process or apparatus, the invention is not limited to such a case and only one of the second differences (1) and the second differences (2) may be output. In this case, the second difference detecting section (1) 20 or the second difference detecting section (2) 21 on the non-output side may be omitted. The difference detecting device 201 may be configured so that selection may be made as to whether to output each of the set of second differences (1) and the set of second differences (2) as detection results to the downstream process or apparatus.

Next, a specific operation which is performed by the difference detecting device 201 will be described with reference to FIGS. 7 and 8.

Figure 8:
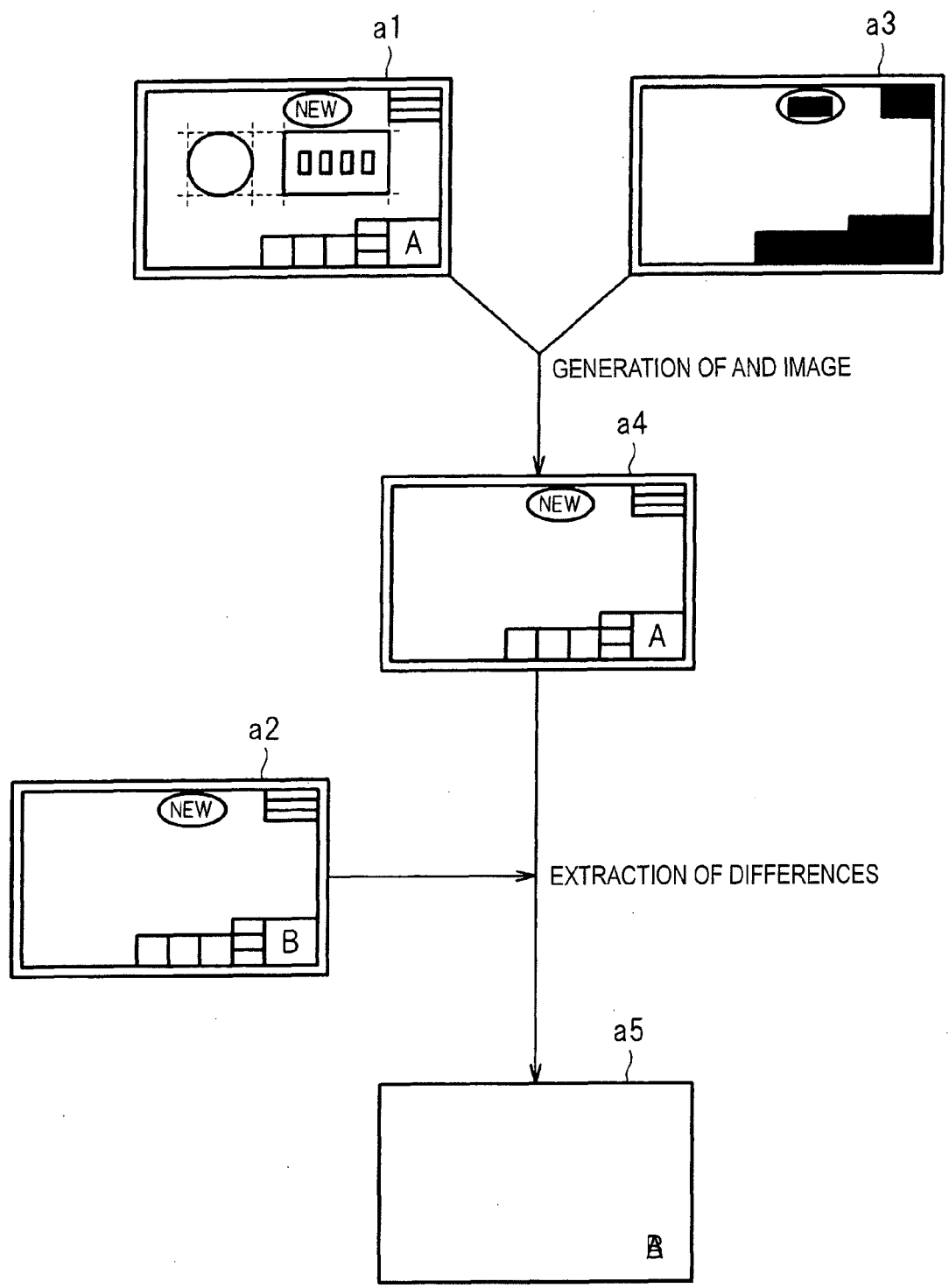
FIG. 8 illustrates an example operation which is performed on first images by the difference detecting device according to the third exemplary embodiment of the invention.

FIG. 8 illustrates an example operation which is performed on first images by the difference detecting device 201 according to the exemplary embodiment. The pieces of processing performed by first exception region acquiring section 4, the second exception region acquiring section 10, and the first difference detecting section 14 of the difference detecting device 201 and results obtained by these pieces of processing are the same as those shown in FIG. 4 and hence will not be described here redundantly. Images shown in FIG. 8 having the same ones in FIG. 4 are given the same symbols as the latter.

First, the second difference detecting section (1) 20 calculates the AND of a first image of attention a1 and first exception regions a3 and thereby generates an AND image a4 which consists of non-background-color pixels common to the first image of attention a1 and first exception regions a3. Then, the second difference detecting section (1) 20 extracts differences between the AND image a4 and a first common image a2 and thereby obtains second differences (1) a5. In this example, the second differences (1) a5 show, at a bottom-right position, that character "A" in the first image of attention a1 and character "B" in the first common image a2 have a difference there. Although in FIG. 8 characters "A" and "B" are drawn in the same color (black) for convenience of description, they may be discriminated from each other. That is, non-background-color pixels that are included in the first image of attention a1 but not included in the first common image a2 and non-background-color pixels that are included in the first common image a2 but not included in the first image of attention a1 may be discriminated from each other. An arbitrary discrimination method may be employed. For example, the two sets of non-background-color pixels may be discriminated from each other by drawing them in different colors or correlating each pixel with information indicating its attribute and changing attributes. The difference detecting device 201 outputs the thus-obtained second differences (1) a5 to a downstream process or apparatus.

The second difference detecting section (2) 21 performs the same operation on second images as the second difference detecting section (1) 20 does on the first images, whereby second differences (2) are obtained. In the case of the second images used in the example of FIG. 4, the second image of attention b1 and the second common image b2 have no differences in the second exception regions b3 an hence second differences (2) obtained are an empty set (only a background color). In this case, the second difference detecting section (2) 21 may output either an image drawn in only the background color or information to the effect that no second differences (2) have been detected.

Figure 9:
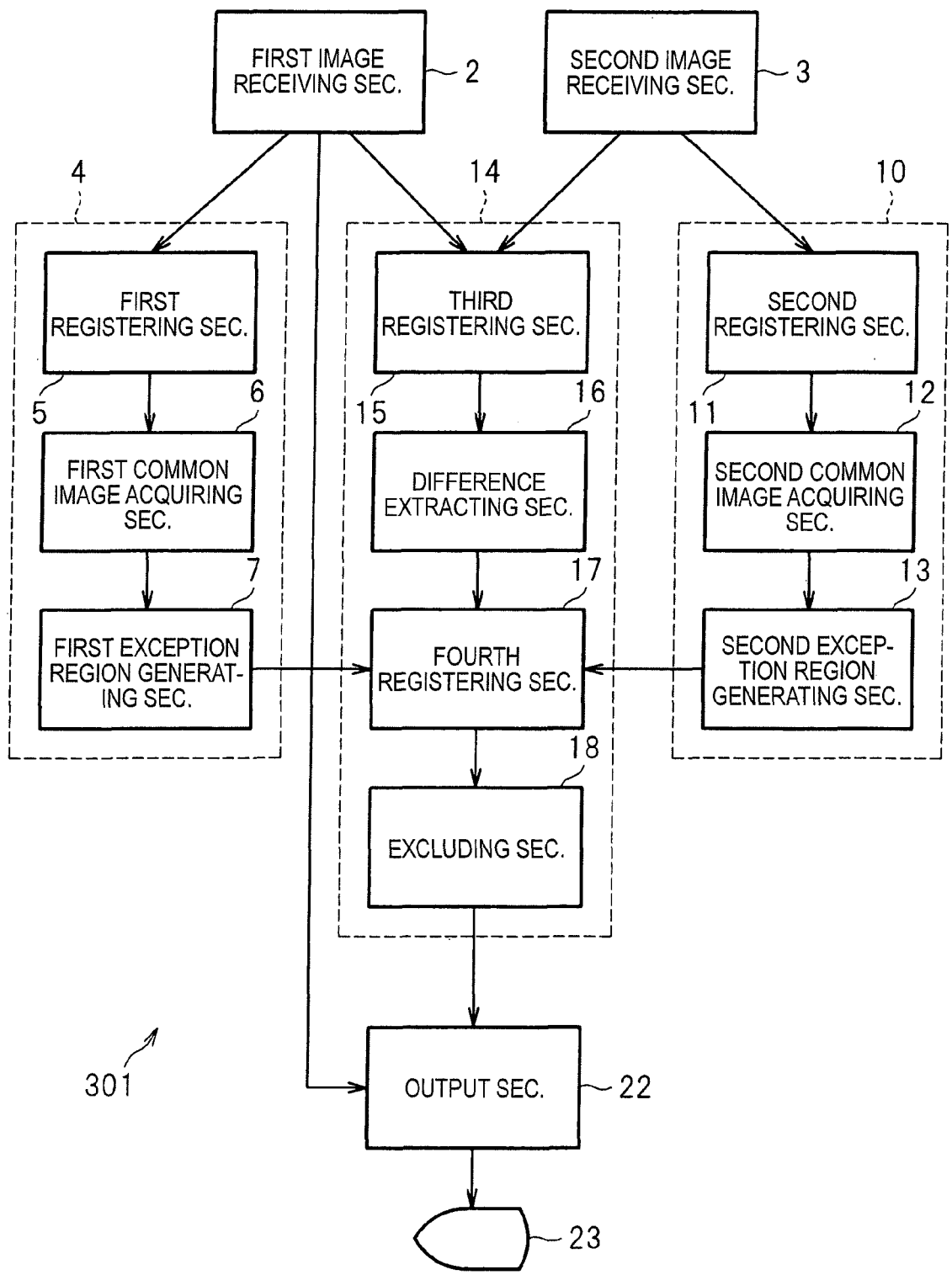
FIG. 9 is a functional block diagram of a difference detecting device according to a fourth exemplary embodiment of the invention.

Next, a fourth exemplary embodiment of the invention will be described. FIG. 9 is a functional block diagram of a difference output device 301 according to the fourth exemplary embodiment of the invention. The difference output device 301 according to this exemplary embodiment is obtained by adding an output section 22 which functions as output means and a monitor 23 to the difference detecting device 1 according to the first exemplary embodiment. That is, the difference output device 301 is equipped with the difference detecting device 1 and the output section 22. The output means is means for outputting differences, detected by the first difference detecting means, between a first image of attention and a second image of attention in such a manner they are superimposed on the first image of attention.

In the exemplary embodiment, the output section 22 outputs an image to the monitor 23. First differences obtained by the first difference detecting section 14 are passed to the output section 22. The sections for detecting first differences are the same in configuration and function as the corresponding sections of the difference detecting device 1 according to the first exemplary embodiment, and hence will be given the same symbols as the latter and will not be described redundantly.

The output section 22 receives a first image of attention and first differences from the first image receiving section 2 and the first difference detecting section 14, respectively, generates an output image by superimposing the first image of attention and the first differences on each other, and outputs the output image to the monitor 23. In the exemplary embodiment, it is not necessary to register the first image of attention and the set of first differences with respect to each other because each of the third registering section 15 and the fourth registering section 17 has performed registration using the first image of attention as a reference. However, depending on the references of registration used, registration may be performed before the output section 22 operates. Furthermore, in superimposing the first differences on the first image of attention, to allow the user to visually recognize where the first differences are, it is preferable that the non-background-color pixels of the first differences be displayed differently than ordinary non-background-color pixels of the first image of attention. And the non-background-color pixels of the first differences may be displayed differently than the ordinary non-background-color pixels of the first image of attention in such a manner that non-background-color pixels that are included in the first image of attention but not included in the second image of attention are discriminated from non-background-color pixels that are included in the second image of attention but not included in the first image of attention. For example, this may be done in such a manner that the non-background-color pixels that are included in the first image of attention but not included in the second image of attention and the non-background-color pixels that are included in the second image of attention but not included in the first image of attention are displayed in different colors, for example, in red and blue, respectively. Alternatively, the two sets of non-background-color pixels may be displayed differently by changing their pixel sizes (visually, the two sets of non-background-color pixels are recognized so as to have different line widths) or by flashing a set of non-background-color pixels concerned. The output image thus obtained is output to the monitor 23 and displayed thereon.

Figure 10:
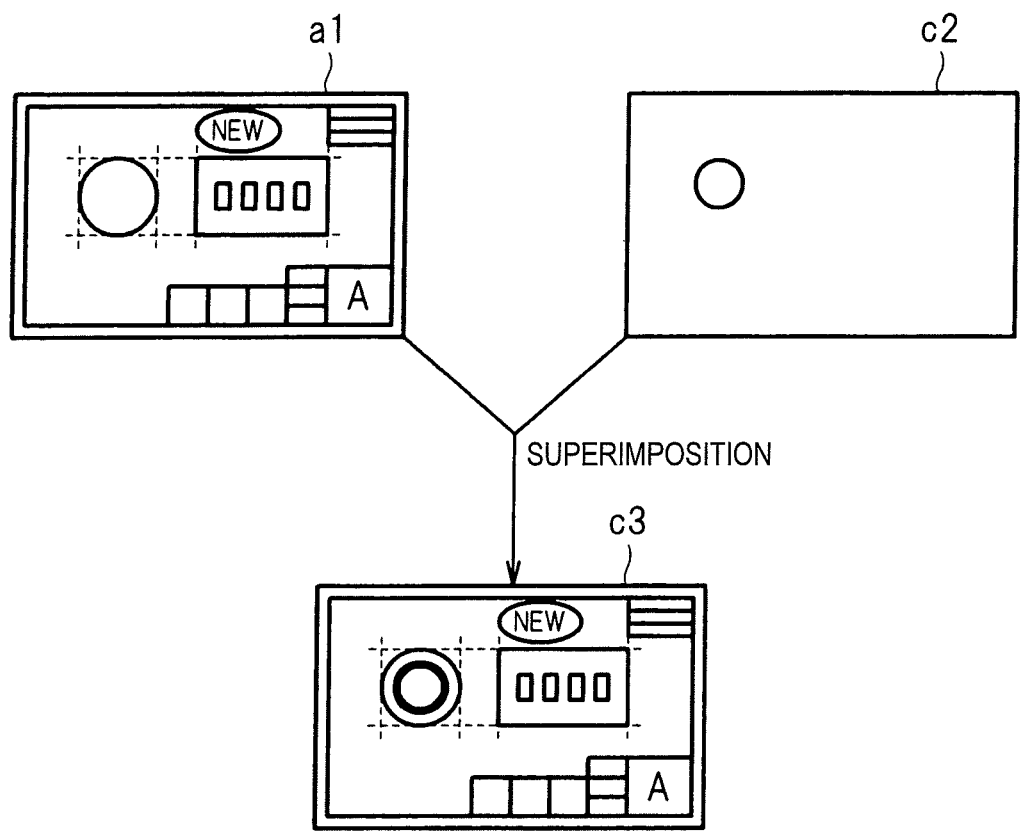
FIG. 10 illustrates an example operation which is performed by an output section of the difference detecting device according to the fourth exemplary embodiment.

FIG. 10 shows an example operation which is performed by the output section 22 of the difference output device 301 according to the fourth exemplary embodiment. Since this example uses the same images as used in the example of FIG. 4, for pieces of processing for obtaining the first differences c2 from the first images A and the second images B, refer to FIG. 4 and the related description of the first exemplary embodiment. As shown in FIG. 10, the output section 22 generates an output image c3 by superimposing the first differences c2 on the first image of attention a1. In the output image c3, the thick-line circle is displayed in blue.

Although in the exemplary embodiment the output section 22 outputs the output image c3 to the monitor 23, this is just an example and the output image c3 may be output to any destination. For example, the output image c3 may be output to and printed by a printer or output to and recorded in another computer or an arbitrary information recording device such as an HDD.

Figure 11:
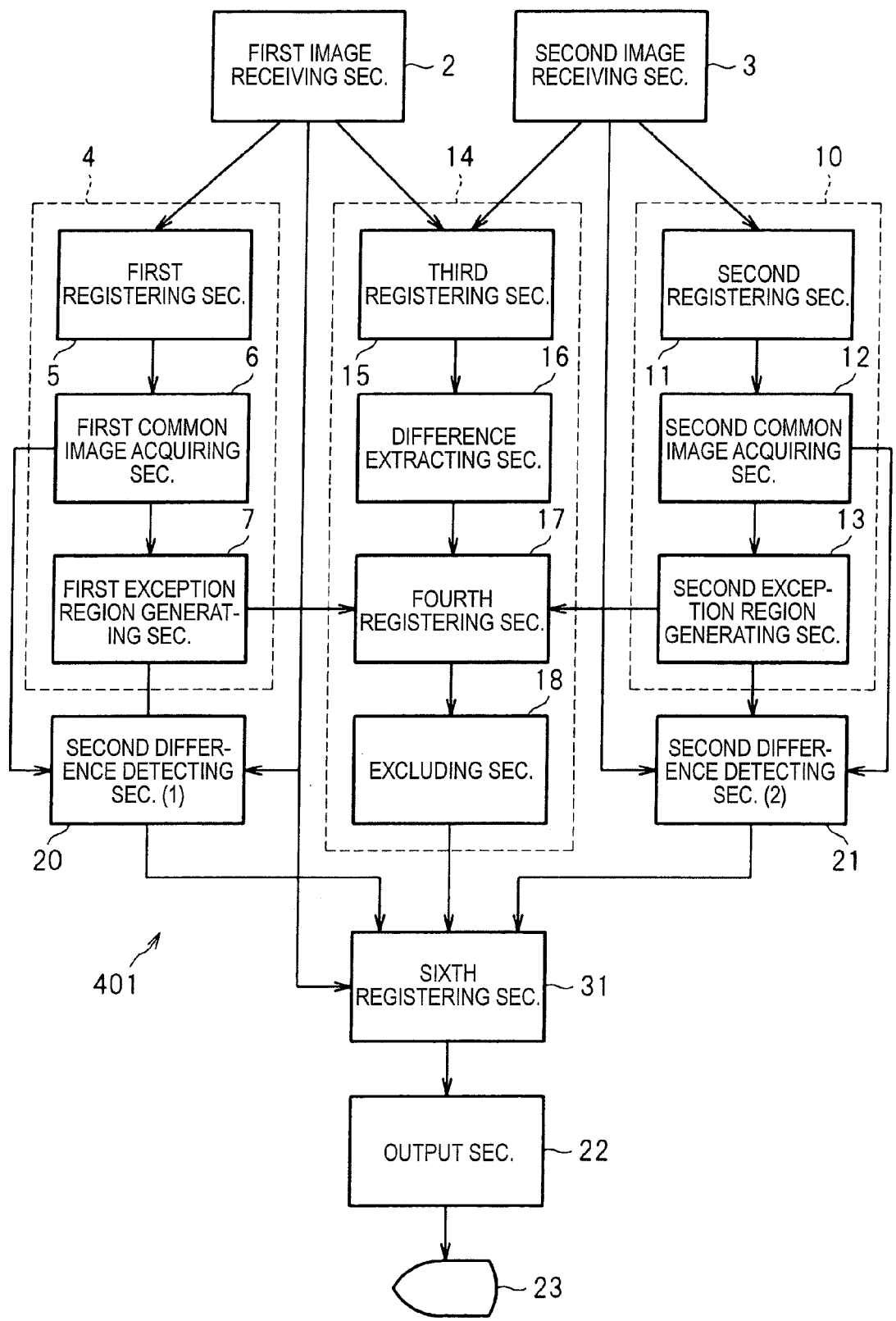
FIG. 11 is a functional block diagram of a difference detecting device according to a fifth exemplary embodiment of the invention.

Finally, a fifth exemplary embodiment of the invention will be described. FIG. 11 is a functional block diagram of a difference output device 401 according to the fifth exemplary embodiment of the invention. The difference output device 401 according to this exemplary embodiment is obtained by adding a sixth registering section 31, an output section 22 which functions as output means and a monitor 23 to the difference detecting device 201 according to the third exemplary embodiment. That is, the difference output device 401 is equipped with the difference detecting device 201, the sixth registering section 31, and the output section 22. In the exemplary embodiment, the output means is means for outputting differences, detected by the first difference detecting means, between a first image of attention and a second image of attention and differences detected by the second difference detecting means, that is, differences between a first common image and a first image of attention in first exception regions, differences between a second common image and a second image of attention in second exception regions, or differences between a first common image and a first image of attention in first exception regions and differences between a second common image and a second image of attention in second exception regions, in such a manner they are superimposed on the first image of attention.

In the exemplary embodiment, as in the fourth exemplary embodiment, the output section 22 outputs an image to the monitor 23. First differences obtained by the first difference detecting section 14, second differences (1) obtained by the second difference detecting section (1) 20, and second differences (2) obtained by the second difference detecting section (2) 21 are passed to the output section 22. The sets of sections for detecting first differences, second differences (1), and second differences (2) are the same in configuration and function as the corresponding sets of sections of the difference detecting device 201 according to the third exemplary embodiment, and hence will be given the same symbols as the latter and will not be described redundantly.

The sixth registering section 31 receives a first image of attention from the first image receiving section 2, first differences from the first difference detecting section 14, second differences (1) from the second difference detecting section (1) 20, and second differences (2) from the second difference detecting section (2) 21. The sixth registering section 31 registers all of these images with respect to each other using an arbitrary reference. Although any reference may be used, in the exemplary embodiment the first image of attention is used as a reference. Movement distances necessary for the registration or coefficients necessary for such transformation as affine transformation are obtained from movement distances or coefficients that are used in the first to fourth registering sections 5, 11, 15, and 17. If all of the first image of attention, the first differences, the second differences (1), and the second differences (2) have already been registered using a unified reference, the sixth registering section 31 is not necessary.

The output section 22 generates an output image by superimposing the first differences, the second differences (1), and the second differences (2) on the first image of attention, and outputs the output image to the monitor 23. In the exemplary embodiment, in superimposing the first differences, the second differences (1), and the second differences (2) on the first image of attention, to allow the user to visually recognize where the first differences, the second differences (1), and the second differences (2) are, it is preferable that the non-background-color pixels of the first differences, the second differences (1), and the second differences (2) be displayed differently than ordinary non-background-color pixels of the first image of attention. The non-background-color pixels of the first differences, the second differences (1), and the second differences (2) may be displayed differently than the ordinary non-background-color pixels of the first image of attention in such a manner that a set of non-background-color pixels that are included in the first image of attention but not included in the second image of attention, a set of non-background-color pixels that are included in the second image of attention but not included in the first image of attention, a set of non-background-color pixels that are included in the first image of attention but not included in the first common image, a set of non-background-color pixels that are included in the first common image but not included in the first image of attention, a set of non-background-color pixels that are included in the second image of attention but not included in the second common image, and a set of non-background-color pixels that are included in the second common image but not included in the second image of attention are discriminated from each other. For example, this may be done in such a manner that the non-background-color pixels that are included in the first image of attention but not included in the second image of attention, the non-background-color pixels that are included in the second image of attention but not included in the first image of attention, the non-background-color pixels that are included in the first image of attention but not included in the first common image, the non-background-color pixels that are included in the first common image but not included in the first image of attention, the non-background-color pixels that are included in the second image of attention but not included in the second common image, and the non-background-color pixels that are included in the second common image but not included in the second image of attention are displayed in different colors, for example, in red, blue, yellow, green, purple, and brown, respectively. Alternatively, the six sets of non-background-color pixels may be displayed differently by changing their pixel sizes (visually, the six sets of non-background-color pixels are recognized so as to have different line widths) or by flashing a set of non-background-color pixels concerned. The output image thus obtained is output to the monitor 23 and displayed thereon.

Figure 12:
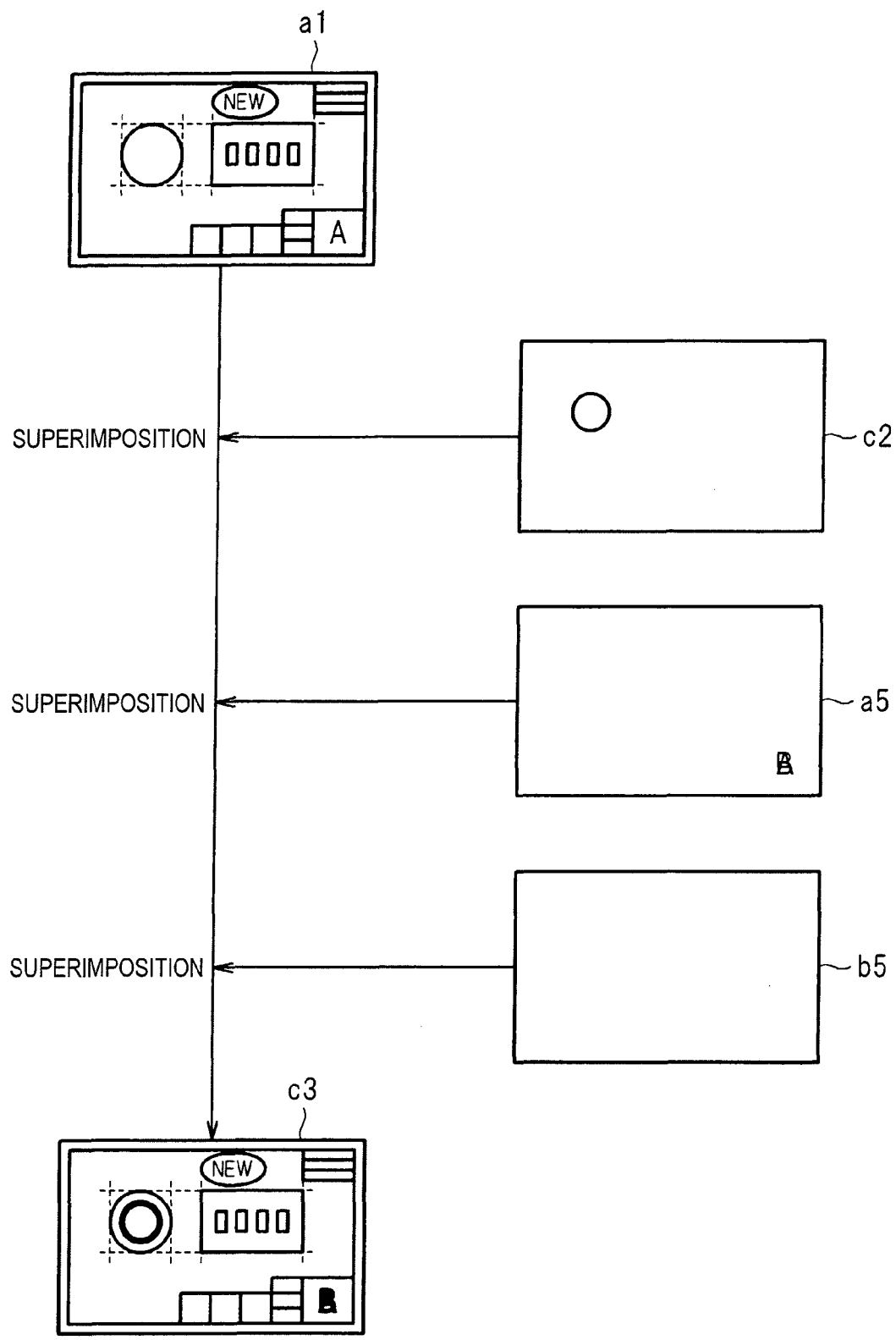
FIG. 12 illustrates an example operation which is performed by an output section of the difference detecting device according to the fifth exemplary embodiment.

FIG. 12 shows an example operation which is performed by the output section 22 of the difference output device 401 according to the fifth exemplary embodiment. Since this example uses the same images as used in the examples of FIGS. 4 and 8, for pieces of processing for obtaining the first differences c2 and the second differences (1) a5 from the first images A and the second images B, refer to FIG. 4 and the related description of the first exemplary embodiment and FIG. 8 and the related description of the third exemplary embodiment.

As shown in FIG. 12, the output section 22 generates an output image c3 by superimposing the first differences c2, the second differences (1) a5, and second differences (2) b5 on the first image of attention a1. In this example, the second differences (2) b5 is an image of only a background color. In the output image c3, the thick-line circle, character "A," and character "B" are displayed in blue, yellow, and green, respectively.

Also in the exemplary embodiment, output destination of the output section 22 is not limited to the monitor 23. For example, the output image c3 may be output to and printed by a printer or output to and recorded in another computer or an arbitrary information recording device such as an HDD.

The functional blocks used in each of the above-described exemplary embodiments are just examples for implementation of each exemplary embodiment. The configuration and arrangement of functional blocks are not limited to those exemplified in each exemplary embodiment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A difference detecting device comprising:
an image receiving unit that receives at least one or more first images and at least one or more second images;
an exception region acquiring unit that acquires (i) first exception regions that include non-background-color pixels of a first common image that consists of non-background-color pixels each of which exists in plural ones of the first images at a common position, (ii) second exception regions that include non-background-color pixels of a second common image that consists of non-background-color pixels each of which exists in plural ones of the second images at a common position, or (iii) both of the first exception regions and the second exception regions; and
a first difference detecting unit, implemented by a processor, that detects differences between a first image of attention which is at least one of the first images and a second image of attention which is one of the second images corresponding to the first image of attention except for the first exception regions, the second exception regions, a union of sets of the first exception regions and the second exception regions, or a product of sets of the first exception regions and the second exception regions.

2. The difference detecting device according to claim 1, further comprising a second difference detecting unit that detects differences between the first common image and the first image of attention in the first exception regions, differences between the second common image and the second image of attention in the second exception regions, or both of the differences between the first common image and the first image of attention in the first exception regions and the differences between the second common image and the second image of attention in the second exception regions.

3. The difference detecting device according to claim 1, wherein if non-background-color pixels of the first common image, the second common image, or both of the first common image and the second common image constitute a character, the exception region acquiring unit employs a region occupied by the character as a first exception region, a second exception region, or both of a first exception region and a second exception region.

4. The difference detecting device according to claim 1, wherein if non-background-color pixels of the first common image, the second common image, or both of the first common image and the second common image constitute a table frame, the exception region acquiring unit employs a region enclosed by the table frame as a first exception region, a second exception region, or both of a first exception region and a second exception region.

5. A difference output device comprising:
an difference detecting device according to claim 1; and
an output unit that outputs the differences, detected by the first difference detecting unit, between the first image of attention and the second image of attention so that the differences are superimposed on the first image of attention.

6. A difference output device comprising:
an difference detecting device according to claim 2; and
an output unit that outputs the differences, detected by the first difference detecting unit, between the first image of attention and the second image of attention and the differences detected by the second difference detecting unit which are the differences between the first common image and the first image of attention in the first exception regions, the differences between the second common image and the second image of attention in the second exception regions, or both of the differences between the first common image and the first image of attention in the first exception regions and the differences between the second common image and the second image of attention in the second exception regions, in such a manner they are superimposed on the first image of attention.

7. A non-transitory computer readable medium storing a computer readable program for causing a computer to execute operations for controlling a difference detecting apparatus, the operations comprising:
receiving one or more first images and one or more second images;
acquiring (i) first exception regions that include non-background-color pixels of a first common image that consists of non-background-color pixels each of which exists in plural ones of the first images at a common position, (ii) second exception regions that include non-background-color pixels of a second common image that consists of non-background-color pixels each of which exists in plural ones of the second images at a common position, or (iii) both of the first exception regions and the second exception regions; and
detecting differences between a first image of attention which is at least one of the first images and a second image of attention which is one of the second images corresponding to the first image of attention except for the first exception regions, the second exception regions, a union of sets of the first exception regions and the second exception regions, or a product of sets of the first exception regions and the second exception regions.

8. The non-transitory computer readable medium according to claim 7, wherein the operations further comprise:
detecting differences between the first common image and the first image of attention in the first exception regions, differences between the second common image and the second image of attention in the second exception regions, or both of the differences between the first common image and the first image of attention in the first exception regions and the differences between the second common image and the second image of attention in the second exception regions.

9. The non-transitory computer readable medium according to claim 7, wherein if non-background-color pixels of the first common image, the second common image, or both of the first common image and the second common image constitute a character, the acquiring employs a region occupied by the character as a first exception region, a second exception region, or both of a first exception region and a second exception region.

10. The non-transitory computer readable medium according to claim 7, wherein if non-background-color pixels of the first common image, the second common image, or both of the first common image and the second common image constitute a table frame, the acquiring employs a region enclosed by the table frame as a first exception region, a second exception region, or both of a first exception region and a second exception region.

11. A method comprising:
receiving one or more first images and one or more second images;
acquiring (i) first exception regions that include non-background-color pixels of a first common image that consists of non-background-color pixels each of which exists in plural ones of the first images at a common position, (ii) second exception regions that include non-background-color pixels of a second common image that consists of non-background-color pixels each of which exists in plural ones of the second images at a common position, or (iii) both of the first exception regions and the second exception regions; and
detecting, using a processor, differences between a first image of attention which is at least one of the first images and a second image of attention which is one of the second images corresponding to the first image of attention except for the first exception regions, the second exception regions, a union of sets of the first exception regions and the second exception regions, or a product of sets of the first exception regions and the second exception regions.

* * * * *